J. S. LYONS.
AUTOMOBILE TIRE AND RIM.
APPLICATION FILED NOV. 4, 1913.
1,138,129.
Patented May 4, 1915.
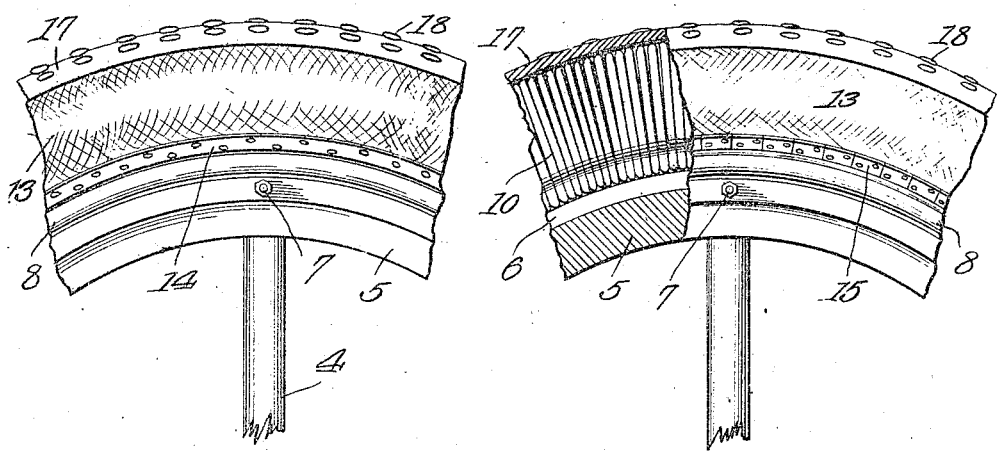
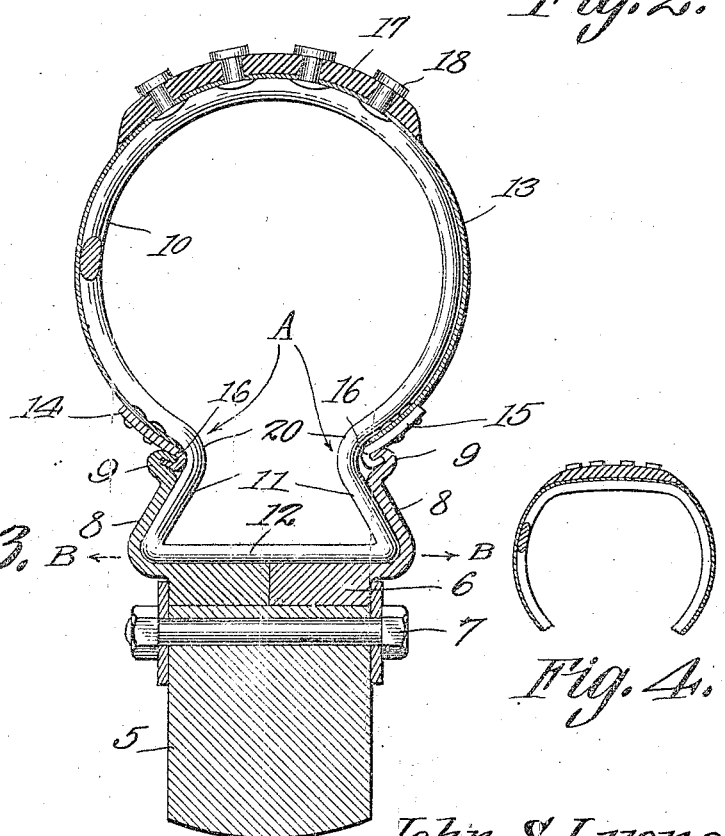
John S. Lyons
Inventor,
Witnesses
by
Attorneys.

UNITED STATES PATENT OFFICE.

JOHN S. LYONS, OF WILKES-BARRE, PENNSYLVANIA, ASSIGNOR OF ONE-HALF TO GEORGE T. BROWN, OF WILKES-BARRE, PENNSYLVANIA.

AUTOMOBILE-TIRE AND RIM.

1,138,129.     Specification of Letters Patent.     Patented May 4, 1915.

Application filed November 4, 1913. Serial No. 799,211.

*To all whom it may concern:*

Be it known that I, JOHN S. LYONS, a citizen of the United States, residing at Wilkes-Barre, in the county of Luzerne and State of Pennsylvania, have invented a new and useful Automobile-Tire and Rim, of which the following is a specification.

This invention relates to improvements in vehicle tires and rims for the reception thereof.

An object of the present invention is to provide a tire formed of resilient wire which will simulate the resiliency and easy riding of the well known pneumatic tire.

A further object of the present invention is to provide a coil of resilient wire and around which is placed a casing or covering and which is engaged by the rim and so held in place.

A further object is to provide a tire, the body portion of which is formed of wire, the wire being bent substantially circular throughout a major arc and is bent outwardly to form diverging arms at the inner peripheral portion of the loop of the wire so that each spring loop is engaged by the converging sides of the wheel rim and held in place thereby.

A further object is to provide a tire the body portion of which is formed of wire wound in the form of coils and with the major portion of each coil formed substantially circular throughout a major arc and with the top of the said circular portion flattened somewhat to thus increase the bearing surface of the tire.

Another object is to provide a wheel with a clencher rim and to which is secured a tire which depends on a helical or continuously coiled spring for its resiliency, the successive convolutions being provided at their base with diverging portions engageable by the converging clencher rim and to provide a casing surrounding and secured to the spring coil and to one side of said casing is secured a continuous ring and to the opposite side is secured a sectional ring both of which are adapted to engage the clencher rims.

With the foregoing and other objects in view which will be apparent as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable embodiment of my invention is illustrated in which:—

Figure 1 is a fragmental view of a wheel and clencher rim with my improved tire secured thereto. Fig. 2 is a similar view in which the outer portion of the tire has been removed to illustrate the internal construction thereof. Fig. 3 is a cross sectional view of the tire and rim. Fig. 4 is a detail view in cross section and with the wire at the upper extremity of the loop somewhat flattened to increase the bearing surface of the tire.

Referring to the drawings wherein analogous elements are referred to by similar ordinals, 4 are the wheel spokes to which is secured the felly 5, the latter carrying a split clencher rim 6. The clencher rim is provided with the usual bolts 7 whereby the parts of the clencher are brought and held in proper relation for the engagement of the tire therebetween.

The clencher rim 6 includes the upwardly and inwardly extending flanges 8, the outer edge of which is bent upon itself as at 9 to define an angularly disposed recess, the longitudinal axis of which when considered in cross section extending substantially parallel to a tangential line to the tire the point of tangency being taken adjacent the said recess and which provides that the longitudinal axis of the recess considered in cross section will extend at right angles to the plane of the converging portions of the rims all of which is clearly illustrated in Fig. 3 of the drawings.

The tire is made up of a continuous coil of wire 10 substantially circular throughout the major portion of a circle and preferably straightened at its upper extremity for a short distance as illustrated in Fig. 4 so that the tire will be given the proper transverse contour and similar to tires now in use. Each convolution of the wire coil is provided at what is termed its base with the downwardly and outwardly converging portions or arms 11 between which extends the base member 12. The angularity of the arms 11 taken with respect to the base member 12 is the same as the angularity of the rims 8 so that each convolution of the spring will be held to the clencher rim by reason of the fact that the base portions of the convolutions fit within and are embraced therebetween, the same being substantially as illustrated in Fig. 3 of the drawings.

Extending around the wire coil 10 is the casing 13 formed of fabric or other suitable material and to the lower extremities of which fabric are secured the clencher rings 14 and 15. The ring 14 as illustrated in Fig. 1 is a unitary structure and is riveted or otherwise held to the casing 13. The ring 15 illustrated in Fig. 2 is formed of a plurality of sections so that the casing may be drawn over or detached from the wire coil. In order that the rings will properly engage the clencher rims 8, the said rings are provided with the upturned edges 16 which are adapted to interlock or interengage with the bent portions 9 of the clencher rims.

Rivetedly secured to the covering or casing 13 is the tread 17, the same being rendered anti-skidding by the rivet heads 18 which project therethrough. The lugs or rivets extend through the casing and are interposed between the adjacent convolutions of the spring coil which prevents the shoe or casing from shifting relative to the coil and vice versa, the coil shifting relative to the shoe. The tire herein described may be easily removed or readily attached to the clencher rim by loosening the bolts 7 and drawing the clencher flanges apart which allows for the disengagement of the rings therefrom after which the sectional ring 15 is first disengaged and the covering and tread is drawn back off of the spring coil after which the continuous ring 14 may also be removed. The spring coil may then be released from the clencher rims and a new tire substituted therefor. The providing of each convolution of the spring coil with the diverging arms 11 and base member 12 extending therebetween adds certain resiliency to the entire coil as the ends of the circular portion 20 of the convolution may shift by bending of the arms 11.

Briefly considered, the tire herein disclosed embodies a helical tread spring, each convolution of which comprises a resilient tread loop, straight, laterally diverging arms 11 and a straight, continuous, intensible cross bar 12 connecting the arms. The cross bar 12 rests upon the base 6, the latter being provided with wings 8 which bear upon the outer faces of the arms 11. Owing to the fact that the arms 11 are straight, there is no tendency for the arms 11 to bend intermediate their ends, and, when the tire is compressed, the pressure is carried into the base 6 along two diverging lines indicated by the arrows A in Fig. 3. Owing to the fact that the pressure is applied in the direction of the arrows A, the side arms 11 tend to separate in the direction of the arrows B. This tendency of the arms 11 to separate in the direction of the arrows B is resisted not only by the wings 8 of the base 6, but by the cross bar 12 as well. It is to be observed that the cross bar 12 is straight, and will remain at a fixed length, thereby to coöperate with the wings 8 in resisting a separation of the arms 11 in the direction of the arrows B. So far as I am advised as to the state of the art, the straight, converging arms 11, in combination with the straight cross bar 12, the base 6 and the wings 8 embrace novel and patentable features. If the arms 11 stood at right angles to the cross bar 12, the force applied longitudinally of the arms 11 would have no component parallel to the cross bar 12 and in the direction of the arrows B. If the bar 12 were of bowed or of arched form, it would be longitudinally extensible and would throw practically all of the strain on the wings 8. If the arms 11 were curved, or constructed otherwise than in the straight form shown, the arms 11 would tend to bend, and, when the tire was compressed, the lateral pressure in the direction of the arrows B would not be transmitted into the base along straight lines represented by the arrows A. The combination, embodying the parts and features above specified operates in a novel manner and produces new results.

Having thus fully described my invention, what I claim is:—

In a tire, a helical tread spring each convolution of which is disposed transversely of the axis of the tire and embodies a resilient tread loop, straight, laterally diverging arms, and a continuous, inextensible cross bar connecting the arms; and a base on which the cross bar rests, the base comprising wings which bear upon the outer faces of the arms, the straight formation of the arms tending to prevent a transverse flexure of the arms intermediate their ends and serving to transmit lateral pressure to the base in straight diverging lines when the loop is compressed, the cross bar being straight from end to end whereby when the loop is compressed, the cross bar will remain at a fixed length and will coöperate with the wings in resisting the tendency of the arms to separate laterally due to the straight diverging relation existing between the arms.

In testimony that I claim the foregoing as my own, I have hereto affixed my signature in the presence of two witnesses.

JOHN S. LYONS.

Witnesses:
NELLIE C. MOONEY,
GEO. T. BROWN.